(12) United States Patent
Kim et al.

(10) Patent No.: US 7,969,547 B2
(45) Date of Patent: Jun. 28, 2011

(54) DISPENSER SYSTEM FOR LIQUID CRYSTAL DISPLAY PANEL AND METHOD OF USING THE SAME

(75) Inventors: Sang-Hyun Kim, Gyoungsangbuk-Do (KR); Sung-Su Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 363 days.

(21) Appl. No.: 11/657,049

(22) Filed: Jan. 24, 2007

(65) Prior Publication Data

US 2007/0115423 A1    May 24, 2007

Related U.S. Application Data

(62) Division of application No. 10/701,489, filed on Nov. 6, 2003, now Pat. No. 7,215,405.

(30) Foreign Application Priority Data

Nov. 19, 2002 (KR) .............................. 2002-072101

(51) Int. Cl.
*G02F 1/1339* (2006.01)
(52) U.S. Cl. ....................................... 349/190; 349/153
(58) Field of Classification Search .................. 349/187, 349/190, 153
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron |
| 4,691,995 A | 9/1987 | Yamazaki |
| 4,775,225 A | 10/1988 | Tsuboyama |
| 5,247,377 A | 9/1993 | Omeis |
| 5,263,888 A | 11/1993 | Ishihara |
| 5,379,139 A | 1/1995 | Sato |
| 5,406,989 A | 4/1995 | Abe |
| 5,499,128 A | 3/1996 | Hasegawa |
| 5,507,323 A | 4/1996 | Abe |
| 5,511,591 A | 4/1996 | Abe |
| 5,539,545 A | 7/1996 | Shimizu |
| 5,548,429 A | 8/1996 | Tsujita |
| 5,642,214 A | 6/1997 | Ishii |
| 5,680,189 A | 10/1997 | Shimizu |
| 5,742,370 A | 4/1998 | Kim |
| 5,757,451 A | 5/1998 | Miyazaki |
| 5,852,484 A | 12/1998 | Inoue |
| 5,854,664 A | 12/1998 | Inoue |
| 5,861,932 A | 1/1999 | Inata |
| 5,875,922 A | 3/1999 | Chastine |
| 5,952,676 A | 9/1999 | Sato |

(Continued)

FOREIGN PATENT DOCUMENTS

EP     1 003 066 A1     5/2000

(Continued)

*Primary Examiner* — Nathanael R Briggs
(74) *Attorney, Agent, or Firm* — McKenna Long & Aldrige LLP

(57) ABSTRACT

A dispenser system for a liquid crystal display panel includes a table to overturn a substrate having at least one image display part on a first surface of the overturned substrate, and at least one syringe system to supply sealant onto a first surface of the overturned substrate to form a seal pattern along outer edges of the image display part on the first surface of the overturned substrate, wherein the at least one syringe system moves along horizontal directions.

4 Claims, 13 Drawing Sheets

U.S. PATENT DOCUMENTS

| | | | |
|---|---|---|---|
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,151,097 A * | 11/2000 | Matuzawa | 349/190 |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 2003/0181123 A1 * | 9/2003 | Lee et al. | 445/25 |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-62370 A | 3/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-166320 | 6/2001 |
| JP | 2001-183683 | 7/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |

| | | | | | | |
|---|---|---|---|---|---|---|
| JP | 2001-305563 | 10/2001 | | JP | 2002-236276 | 8/2002 |
| JP | 2001-330837 | 11/2001 | | JP | 2002-258299 | 8/2002 |
| JP | 2001-330840 | 11/2001 | | JP | 2002-236292 | 9/2002 |
| JP | 2001-356353 | 12/2001 | | JP | 2002-277865 | 9/2002 |
| JP | 2001-356354 | 12/2001 | | JP | 2002-277866 | 9/2002 |
| JP | 2002-014360 | 1/2002 | | JP | 2002-277881 | 9/2002 |
| JP | 2002-023176 | 1/2002 | | JP | 2002-287156 | 10/2002 |
| JP | 2002-049045 | 2/2002 | | JP | 2002-296605 | 10/2002 |
| JP | 2002-079160 | 3/2002 | | JP | 2002-311438 | 10/2002 |
| JP | 2002-080321 | 3/2002 | | JP | 2002-311440 | 10/2002 |
| JP | 2002-082340 | 3/2002 | | JP | 2002-311442 | 10/2002 |
| JP | 2002-090759 | 3/2002 | | JP | 2002-318547 | 10/2002 |
| JP | 2002-090760 | 3/2002 | | JP | 2002-323687 | 11/2002 |
| JP | 2002-107740 | 4/2002 | | JP | 2002-323694 | 11/2002 |
| JP | 2002-122870 | 4/2002 | | JP | 2002-333628 | 11/2002 |
| JP | 2002-122872 | 4/2002 | | JP | 2002-333635 | 11/2002 |
| JP | 2002-122873 | 4/2002 | | JP | 2002-333843 | 11/2002 |
| JP | 2002-131762 | 5/2002 | | JP | 2002-341329 | 11/2002 |
| JP | 2002-139734 | 5/2002 | | JP | 2002-341355 | 11/2002 |
| JP | 2002-156518 | 5/2002 | | JP | 2002-341356 | 11/2002 |
| JP | 2002-169166 | 6/2002 | | JP | 2002-341357 | 11/2002 |
| JP | 2002-169167 | 6/2002 | | JP | 2002-341358 | 11/2002 |
| JP | 2002-182222 | 6/2002 | | JP | 2002-341359 | 11/2002 |
| JP | 2002-202512 | 7/2002 | | JP | 2002-341362 | 11/2002 |
| JP | 2002-202514 | 7/2002 | | KR | 2000-0035302 | 6/2000 |
| JP | 2002-214626 | 7/2002 | | * cited by examiner | | |
| JP | 2002-229042 | 8/2002 | | | | |

DISPENSER SYSTEM FOR LIQUID CRYSTAL DISPLAY PANEL AND METHOD OF USING THE SAME

This application is a Divisional of prior application Ser. No. 10/701,489, filed Nov. 6, 2003, now U.S. Pat. No. 7,215,405 which claims the benefit of Korean Patent Application No. P2002-072101 filed in Korea on Nov. 19, 2002, which is hereby incorporated by reference in its entirety as if fully set forth herein.

BACKGROUND OF THE INVENTION

1. Field of the Invention

The present invention relates to a dispensing system and a method using a dispensing system, and more particularly, to a dispenser system for a liquid crystal display panel and a method of using a dispensing system.

2. Discussion of the Related Art

In general, a liquid crystal display panel is used to display images according to data signals supplied to individual liquid crystal cells arranged in a matrix configuration, wherein light transmittance of the individual liquid crystal cells is controlled to display the image. Accordingly, liquid crystal display (LCD) devices include a liquid crystal display panel where a driver integrated circuit (IC) drives the individual liquid crystal cells.

The liquid crystal display panel includes a color filter substrate and a thin film transistor array substrate attached to each other, wherein a liquid crystal layer in disposed between the color filter substrate and the thin film transistor array substrate. In addition, the thin film transistor array substrate includes data lines and gate lines to intersect at right angles, thereby defining liquid crystal cells at every intersection of the data lines and gate lines. The data lines transmit data signals supplied from a data driver integrated circuit to the individual liquid crystal cells, and the gate lines transmit scan signals supplied from the gate driver integrated circuit to the individual liquid crystal cells. Data pads and gate pads are provided at distal end portions of each of the data and gate lines, respectively, to supply data signals and scan signals from the data driver integrated circuit and the gate driver integrated circuit to the data and gate lines, respectively. The gate driver integrated circuit sequentially supplies the scan signals to the gate lines so that the individual liquid crystal cells arranged in the matrix configuration can be sequentially selected on a line-by-line basis. Similarly, a data driver integrated circuit supplies the data signals to the data lines so that selected ones of the individual liquid crystal cells arranged in the matrix configuration can be provided with the data signals.

A common electrode and a pixel electrode are formed along inner surfaces of the color filter substrate and the thin film transistor array substrate, respectively, thereby supplying an electric field to the liquid crystal layer. The pixel electrode is formed at each of the individual liquid crystal cells on the thin film transistor array substrate, whereas the common electrode is integrally formed along an entire surface of the color filter substrate. Thus, by controlling voltages supplied to the pixel electrode and the common electrode, light transmittance of the individual liquid crystal cells can be individually controlled. In order to control the voltage supplied to the pixel electrode, a thin film transistor, which is commonly used as a switching device is formed at each of the individual liquid crystal cells.

FIG. 1 is a plan view of a liquid crystal display panel according to the related art. In FIG. 1, a liquid crystal display panel 100 includes an image display part 113 where individual liquid crystal cells are arranged in a matrix configuration, a gate pad part 114 connected to gate lines of the image display part 113, and a data pad part 115 connected to data lines of the image display part 113. The gate pad part 114 and the data pad part 115 are formed along edge regions of a thin film transistor array substrate 101 that does not overlap with a color filter substrate 102. The gate pad part 114 supplies scan signals from a gate driver integrated circuit (not shown) to the gate lines of the image display part 113, and the data pad part 115 supplies image information from the data driver integrated circuit (not shown) to the data lines of the image display part 113.

The data lines and the gate lines are provided on the thin film transistor array substrate 101 to intersect each other, wherein a thin film transistor for switching the liquid crystal cells is provided at the intersection of the data lines and the gate lines. In addition, a pixel electrode for driving the individual liquid crystal cells is connected to the thin film transistor provided on the thin film transistor array substrate 101, and a passivation film for protecting the pixel electrode and the thin film transistor is formed along an entire surface of the thin film transistor array substrate 101.

Color filters are separately coated at cell regions defined by a black matrix formed on the color filter substrate 102. In addition, a common transparent electrode is provided on the color filter substrate 102.

A cell gap is formed by spacers disposed between the thin film transistor array substrate 101 and the color filter substrate 102, and the thin film transistor array substrate 101 and the color filter substrate 102 are attached together using a seal pattern 116 formed along an outer edge of the image display part 113, wherein a cell gap is formed by spacers disposed between the thin film transistor array substrate 101 and the color filter substrate 102.

During fabrication of the liquid crystal display panel, a process for simultaneous formation of a plurality of unit liquid crystal display panels on a single glass substrate is commonly used. Accordingly, the process requires dividing the plurality of unit liquid crystal display panels formed on the single glass substrate using a cutting process to produce a plurality of individual liquid crystal display panels. Next, liquid crystal material is injected through a liquid crystal injection opening of each of the individual liquid crystal display panels to form a liquid crystal layer within the cell-gap that separates the thin film transistor array substrate 101 and the color filter substrate 102. Then, the liquid crystal injection openings are sealed.

FIGS. 2A and 2B are schematic plan and cross sectional views of a process for formation of a seal pattern according to the related art. In FIGS. 2A and 2B, a screen printing method includes patterning a screen mask 206 so that a plurality of seal pattern forming regions are selectively exposed, and selectively supplying a sealant 203 to the substrate 200 through a screen mask 206 using a rubber squeegee 208 to simultaneously form a plurality of seal patterns 216A~216F. The plurality of seal patterns 216A~216F formed on the substrate 200 provide a gap into which a liquid crystal layer is formed, and prevent leakage of the liquid crystal material to an exterior of the plurality of seal patterns 216A~216F. Accordingly, the plurality of seal patterns 216A~216F are formed along outer edges of the image display parts 213A~213F of the substrate 200, and a plurality of liquid crystal injection openings 204A~204F are formed at each one side of the seal patterns 216A~216F.

The screen printing method includes applying the sealant 203 on the screen mask 206 with the seal pattern forming regions patterned thereon, forming the plurality of seal patterns 216A~216F on the substrate 200 through printing with the rubber squeegee 208, and evaporating a solvent contained in the seal patterns 216A~216F and leveling them. The screen printing method is advantageous because of its convenience, but it is disadvantageous because of excessive consumption of the sealant 203 since the sealant 203 is applied along an entire surface of the screen mask 206 and printed using the rubber squeegee 208 to simultaneously form the plurality of seal patterns 216A~216F. In addition, the screen printing method is problematic since a rubbing process of an orientation film (not shown) formed on the substrate 200 is altered as the screen mask 206 and the substrate 200 contact each other, thereby degrading image quality of the liquid crystal display device. Thus, a seal dispensing method has been proposed.

FIG. 3 is a schematic plan view of a seal pattern according to the related art. In FIG. 3, a seal dispensing method includes forming a plurality of seal patterns 316A~316F along outer edges of a plurality of image display parts 313A~313F formed on a substrate 300 by applying a certain pressure to syringes 301A~301C filled with a sealant as a table 310 moves along forward/backward and left/right directions. Accordingly, the plurality of seal patterns 316A~316F are sequentially formed as single lines around the image display parts 313A~313F. During the seal dispensing method, since the sealant is selectively supplied to regions where the seal patterns 316A~316F are to be formed, sealant consumption may be reduced. In addition, since the syringes 301A~301C do not contact an orientation film (not shown) of the image display part 313 of the substrate 300, the alignment of the rubbed orientation film would not be damaged and image quality of the liquid crystal display device may be improved.

In order to form the seal patterns 316A~316F, the table 210 may be fixed and the syringes 301A~301C may be horizontally moved along the forward/backward and left/right directions around the image display parts 313A~313F. Accordingly, a certain pressure is applied to the syringes 301A~301C filled with the sealant to dispense the sealant onto the substrate 300, and the syringes 301A~301C are moved along the forward/backward and left/right directions. However, foreign material generated from moving the syringes 301A~301C may be deposited onto the image display parts 313A~313C, thereby contaminating the liquid crystal display panel. Thus, in order to avoid contamination, the syringes 301A~301C remain fixed and the table 310 is moved along the forward/backward and left/right directions.

However, keeping the syringes 301A~301C fixed and moving the table 310 may be problematic. As an overall size of the liquid crystal display panel is enlarged, a corresponding area of the substrate 300 for fabricating the large-scale liquid crystal display panel increases. Thus, in order to form the seal patterns 316A~316F on the substrate 300, a driving distance of the table 310 is doubled in accordance with a short side of the substrate 300. Accordingly, if a length of the short side of the substrate 300 is doubled, then the driving distance of the table 310 is increased by at least a factor of four. Therefore, if the area of the substrate 300 is increased, the dispenser occupies more space, thereby degrading clean room efficiency. In addition, since the table 310 is moved horizontally along forward/backward and left/right directions, a total time for forming the plurality of seal patterns 316A~316F increases, thereby degrading productivity and efficiency.

SUMMARY OF THE INVENTION

Accordingly, the present invention is directed to a dispenser system for liquid crystal display panels and method of using a dispenser system for liquid crystal display panels that substantially obviates one or more of the problems due to limitations and disadvantages of the related art.

An object of the present invention is to provide to a dispenser system for a liquid crystal display panel for increasing productivity.

Another object of the present invention is to provide a method of using a dispenser system for a liquid crystal display panel for increasing productivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended claims.

To achieve these and other advantages and in accordance with the purpose of the present invention, as embodied and broadly described, a dispenser system for a liquid crystal display panel includes a table to overturn a substrate having at least one image display part on a first surface of the overturned substrate, and at least one syringe system to supply sealant onto a first surface of the overturned substrate to form a seal pattern along outer edges of the image display part on the first surface of the overturned substrate, wherein the at least one syringe system moves along horizontal directions.

In another aspect, a dispenser system for a liquid crystal display panel includes a table to load, fix, and vertically align a substrate having at least one image display part formed on a first surface of the substrate, and at least one syringe system to supply sealant onto the first surface of the vertically-aligned substrate to form a seal pattern along outer edges of the at least one image display part, wherein the at least one syringe system moves along a vertical direction relative to a position of the substrate.

In another aspect, a method of using a dispenser system for a liquid crystal display panel includes loading and fixing a substrate on a table, overturning the table and the substrate, and supplying sealant from the dispenser system onto a first surface of the overturned substrate to form at least one seal pattern.

In another aspect, a method of using a dispenser system for a liquid crystal display panel includes loading and fixing a substrate on a table, rotating the table to vertically align the substrate, and supplying sealant from the dispenser system onto a first surface of the vertically-aligned substrate to form at least one seal pattern.

In another aspect, a method of dispensing sealant for a liquid crystal display panel includes loading and fixing a substrate on a table, overturning the table and the substrate, and supplying sealant from a dispenser system onto a first surface of the overturned substrate to form at least one seal pattern.

In another aspect, a method of dispensing sealant for a liquid crystal display panel includes loading and fixing a substrate on a table, vertically aligning the substrate, and supplying sealant from a dispenser system onto a first surface of the vertically-aligned substrate to form at least one seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 4:
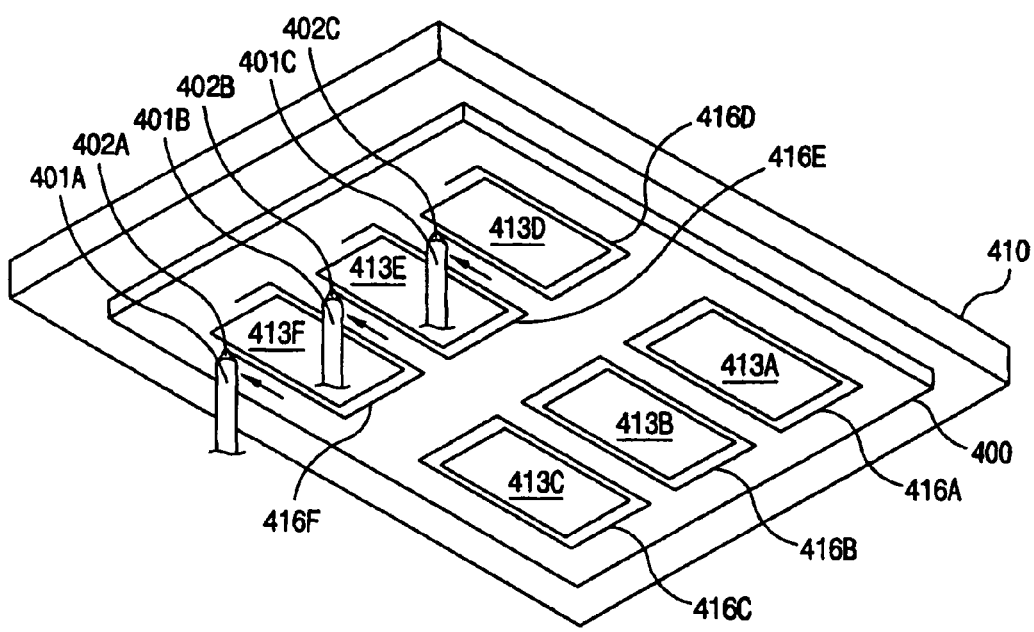
FIG. 4 is a perspective schematic view of an exemplary dispenser system for a liquid crystal display panel according to the present invention.

FIG. 4 is a perspective schematic view of an exemplary dispenser system for a liquid crystal display panel according to the present invention. In FIG. 4, a dispenser system may include a plurality of syringes 401A~401C for supplying a sealant along outer edges of image display parts 413A~413F of an overturned substrate 400 using a plurality of nozzles 402A~402C provided at end portions of the syringes 401A~401C to form a plurality of seal patterns 416A~416F. Accordingly, table 410 may remain fixed while the syringes 401A~401C may move along horizontal directions to form the plurality of seal patterns 416A~416F. In FIG. 4, the table 410 may be first loaded with the substrate 400, wherein the plurality of image display parts 413A~413F may have been previously formed thereon. The substrate 400 may be a large-scale first glass substrate formed upon which a plurality of thin film transistors may have been previously fabricated, or a large-scale second glass substrate upon which a plurality of color filters may have previously fabricated.

The syringes 401A~401C may be provided to correspond to a total number to the image display parts 413A~413F formed on the substrate 400, thereby simultaneously forming the plurality of seal patterns 416A~416F along the outer edges of the image display parts 413A~413F. For example, if the image display parts formed on the substrate 400 have a matrix configuration including an M-number of lines and an N-number of columns, a matrix array of syringes may be provided to have an M-number of line syringes and an N-number of column syringes to provide sealant around the M×N matrix of image display parts formed on the substrate 400. Alternatively, the syringes may be provided to correspond to at least one line or at least one column of the image display parts having the M×N matrix configuration. In addition, the syringes may be driven simultaneously, may be driven individually, or may be driven in groups.

Figure 5:
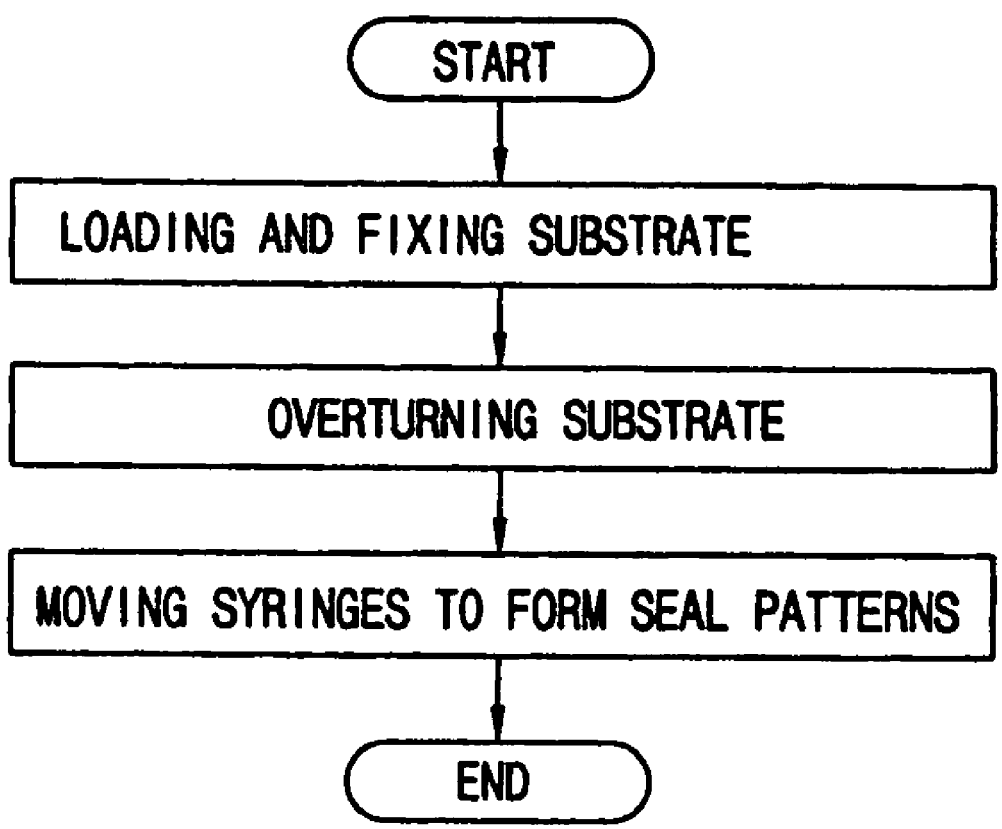
FIG. 5 is a flow chart of an exemplary method of using a dispenser system using the dispenser system of FIG. 4 according to the present invention.

FIG. 5 is a flow chart of an exemplary method of using a dispenser system using the dispenser system of FIG. 4 according to the present invention. In FIG. 5, the substrate 400 having the plurality of image display parts 413A~413F formed thereon may be loaded and fixed onto the table 410 during a step of loading and fixing. Next, the substrate 400 may overturned during a step of overturning. Then, the syringes 401A~401C, which have the nozzles 402A~402C provided end portions thereof, may supply sealant along outer edges of the image display parts 413A~413F of the overturned substrate 400 to form the seal patterns 416A~416F, while being moved horizontally along forward/backward and left/right directions during a step of moving syringes to form seal patterns. Accordingly, since the driving of the syringes 401A~401C may be performed within an area of the substrate 400, even though the area of the substrate 400 increases, a size of the dispenser system for forming the seal patterns 416A~416F on the substrate 400 may change (i.e., increase or decrease) according to the increased area to the substrate 400. In addition, since the syringes may be provided to correspond to the total number to the image display parts formed on the substrate 400 and may be simultaneously or individually driven to form the seal patterns, an overall time to form the seal patterns may be reduced as compared to driving the table.

The exemplary seal patterns 416A~416F (in FIG. 4) formed by the dispenser system may differ in their form according to the method in which the liquid crystal layer is formed for the liquid crystal display panel. For example, using the vacuum injection method may require formation of an injection port in the seal patterns 416A~416F (in FIG. 4). However, the vacuum injection method may be problematic. First, since a significant amount of time is required to fill the liquid crystal material into the liquid crystal display panel, overall fabrication time of the liquid crystal display panel may be significantly increased. For example, when fabricating a liquid crystal display panel of about 15 inches, about 8 hours are required to fill the liquid crystal display panel with the liquid crystal material. In addition, as an overall size of the liquid crystal display panel increases, time required for filling the liquid crystal material increases. Thus, the vacuum injection method may not be adequate for large-scale liquid crystal display panels.

Second, significant amounts of the liquid crystal material are wasted due to the inherent processes for the vacuum injection method. For example, actual amounts of the injected liquid crystal material is very small compared to amounts of the liquid crystal material filled in the container used to fill the liquid crystal display panels, and when the liquid crystal material is exposed to air or to specific gases, the liquid crystal material may react with the gases and be degraded. Thus, even if large amounts of the liquid crystal material filled in the container is used to fill a plurality of the liquid crystal display panels, a relatively significant amount of the liquid crystal material remaining in the container must be discarded. Accordingly, a unit price of the liquid crystal display panel would increase.

In order to overcome the problems and disadvantages of the vacuum injection method, a dropping method has been developed. The dropping method includes dropping a liquid crystal material onto a plurality of thin film transistors fabricated on a first large-scale glass substrate or on a plurality of color filters fabricated on a second large-scale glass substrate using a dispenser system. Then, the first and second glass substrates may be attached together to uniformly distribute the liquid crystal material along an entire image display region by applying pressure to the first and second glass substrates, thereby forming a liquid crystal layer. Since the liquid crystal material may be directly dropped onto either of the first or second glass substrates, the seal patterns 416A~416F may be formed as a closed pattern encompassing each outer edge of the image display parts 413A~413F, as shown in FIG. 4, thereby preventing leakage of the liquid crystal material. An ultraviolet (UV) hardening sealant may be used to form the seal patterns 416A~416F. Alternatively, a mixture of the ultraviolet hardening sealant and a thermosetting sealant may be applied. In addition, the liquid crystal material may be dropped within a comparatively short amount of time as compared to the vacuum injection method. Moreover, although the liquid crystal display panel may have a large size, the liquid crystal layer may be formed quickly between the first and second glass substrates, thereby increasing productivity. Thus, an increase in unit price of the liquid crystal display panel may be prevented.

During the exemplary method of FIG. 5, liquid crystal material dropped onto the substrate 400 prior to the overturning of the substrate may result in a flow of the liquid crystal material. Accordingly, the seal patterns 416A~416F may be formed on the substrate 400 upon which liquid crystal material may not be dropped. Alternatively, by using of the ultraviolet hardening sealant to form the seal patterns 416A~416F, flow of the liquid crystal material may not occur although the substrate 400 is overturned. For example, the ultraviolet hardening sealant may have a viscosity of about 400,000 cP (centi-Poise) wherein sealants with viscosities of above 100,000 cP (centi-Poise) may not flow in spite of the overturning of the substrate 400.

Figure 6:
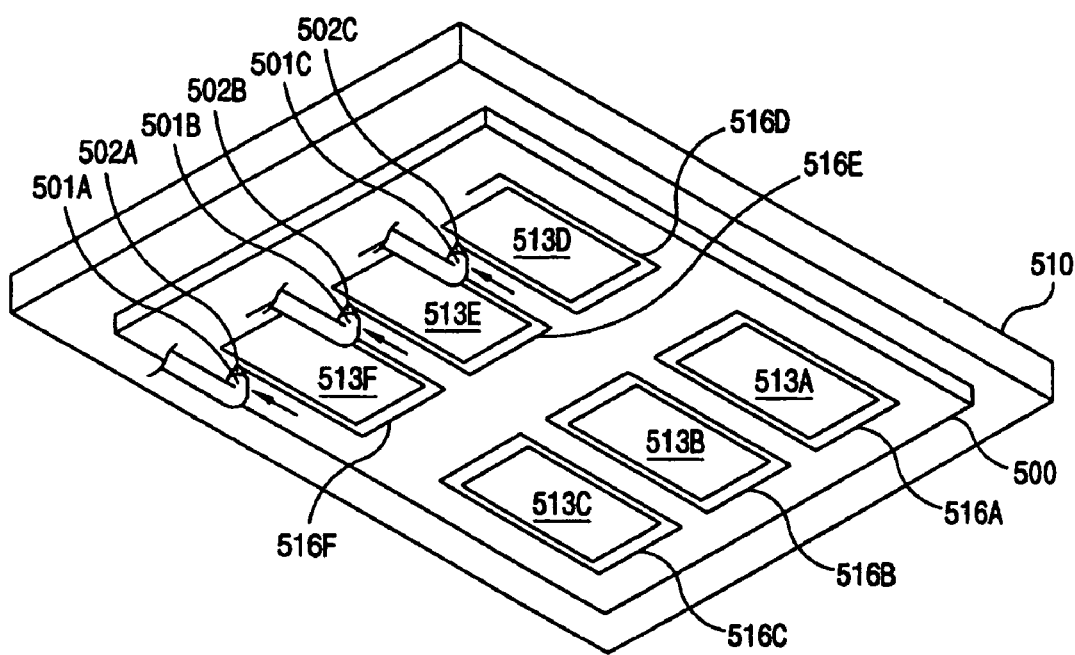
FIG. 6 is a schematic plan view of another exemplary dispenser system for a liquid crystal display panel according to the present invention.

FIG. 6 is a schematic plan view of another exemplary dispenser system for a liquid crystal display panel according to the present invention. In FIG. 6, a dispenser system for a liquid crystal display panel may include a table 510 to overturn a loaded substrate 500 having a plurality of image display parts 513A~513F formed thereon, and a plurality of syringes 501A~501C to supply a sealant along outer edges of the image display parts 513A~513F of the overturned substrate 500 through nozzles 502A~502C provided at end portions of the syringes 501A~501C. Accordingly, the syringes 501A~501C may be used to form the seal patterns 516A~516F, while the table 510 may remain fixed and the syringes 501A~501C may be moved along horizontal directions.

During a method of using the dispenser system of FIG. 6, the substrate 500 may be loaded and fixed onto the table 510, and the table 510 may be overturned and fixed. Then, the syringes 501A~501C may supply the sealant along the outer edges of the image display parts 513A~513F of the substrate 500 to form the seal patterns 516A~516F, while the syringes 501A~501C may be moved along horizontal forward/backward and left/right directions. Accordingly, since driving of the syringes 501A~501C may be performed within an area of the substrate 500, although the area of the substrate 500 increases, a size of the dispensing system for forming the seal patterns 516A~516F on the substrate 500 may increase in relation to the increased area of the substrate 500.

FIG. 6, bodies of the syringes 501A~501C may be positioned below the substrate 500 along the horizontal direction parallel of the table 510. In addition, portions of the bodies of the syringes 501A~501C may be bent toward the substrate 500 so that the nozzles 502A~502C provided at the end portions may be positioned at the outer edges of the image display parts 513A~513F of the substrate 500. Accordingly, a pressure for supplying the sealant filled in the syringes 501A~501C onto the substrate 500 through the nozzles 502A~502C may be reduced, thereby improving control of the dispensing of the sealant onto the substrate 500.

Figure 7:
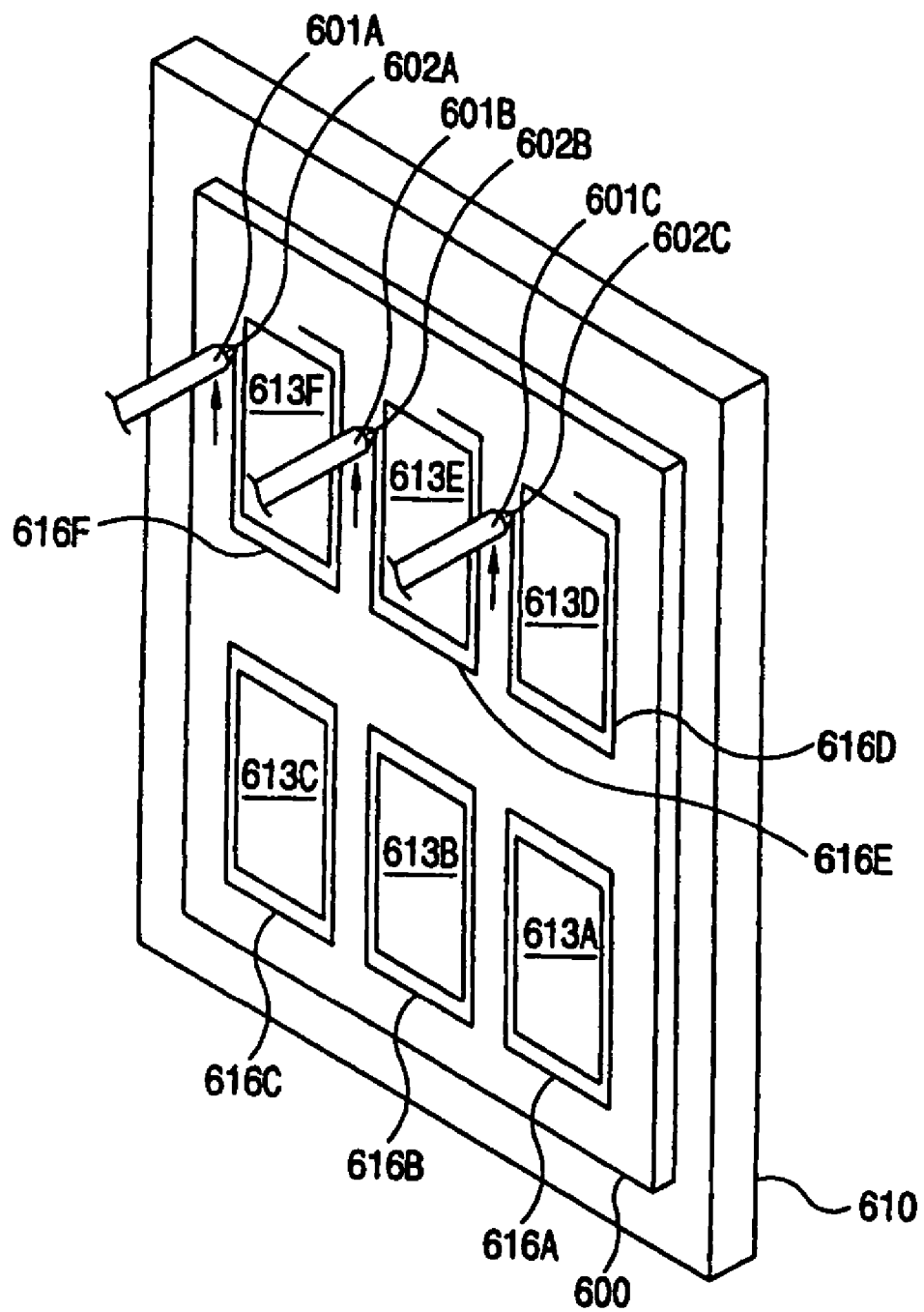
FIG. 7 is a schematic plan view of another exemplary dispenser system for a liquid crystal display panel according to the present invention.

FIG. 7 is a schematic plan view of another exemplary dispenser system for a liquid crystal display panel according to the present invention. In FIG. 7, a dispenser system may include a table 610 disposed along a vertical direction, in which a substrate 600 having image display parts 613A~613F formed thereon may be loaded and fixed thereupon. The system may further include a plurality of syringes 601A~601C to supply a sealant along outer edges of the image display parts 613A~613F of the substrate 600 through nozzles 602A~602C, which may be provided at ends of the plurality of syringes 601A~601C, while the plurality of syringes 601A~601C may be moved along vertical directions relative to the substrate 600. The substrate 600 may be a large-scale glass substrate having a plurality of thin film transistors formed thereon or may be a large-scale glass substrate having a plurality of color filters formed thereon.

The syringes of 601A~601C may be provided to correspond to a total number of image display parts 613A~613F formed on the substrate 600, thereby simultaneously forming the plurality of seal patterns 616A~616F along the outer edges of the image display parts 613A~613F. For example, if the image display parts are formed having a matrix array of an M-number of lines and an N-number of columns on the substrate 600, an M×N number array of syringes may be provided to correspond to the image display parts. Alternatively, the syringes 601A~601C may be provided to correspond to at least one line or at least one column of the image display parts having a matrix array of an M-number of lines and an N-number of columns. In addition, the syringes 601A~601C may be driven simultaneously, individually, or in groups.

A method for using the dispenser system of FIG. 7 may include loading and fixing the substrate 600 onto the table 610, wherein the table 600 may be positioned along a vertical direction or may be transitioned from a horizontal direction to a vertical direction. Then, the syringes 601A~601C may supply the sealant to form the seal patterns 616A~616F along the outer edges of the image display parts 613A~613F of the substrate 400 while the syringes 601A~601C are vertically moved along forward/backward and left/right directions. Accordingly, since driving of the syringes 601A~601C may be performed within an area of the substrate 600, although the area of the substrate 600 may increase, a size of the dispenser system for forming the seal patterns 616A~616F on the substrate 600 may increase in accordance with the increased area to the substrate 600.

In addition, since the syringes 601A~601C may be simultaneously, individually, group driven to form the seal patterns 616A~616M×N, an overall time taken for forming the seal patterns 616A~616E may be reduced. Moreover, although the area of the image display parts 613A~613E may change according to a change of the liquid crystal display panel or according to an increase in the area of the substrate 600, the dispenser system and method of using the dispenser system may effectively compensate for the changes and increases.

In FIG. 7, the syringes 601A~601C are positioned along a horizontal direction at a right angle below a surface of the vertically-aligned substrate 600 so that the nozzles 602A~602C provided at the end portions of the syringes 601A~601C may be positioned along an outer edge of the image display parts 613A~613F of the substrate 600. Accordingly, since a relatively low amount of pressure may be required for supplying the sealant filled in the syringes 601A~601C to the outer edges of the image display parts 613A~613F of the substrate 600, the sealant supplying pressure may be easily controlled.

Figure 1:
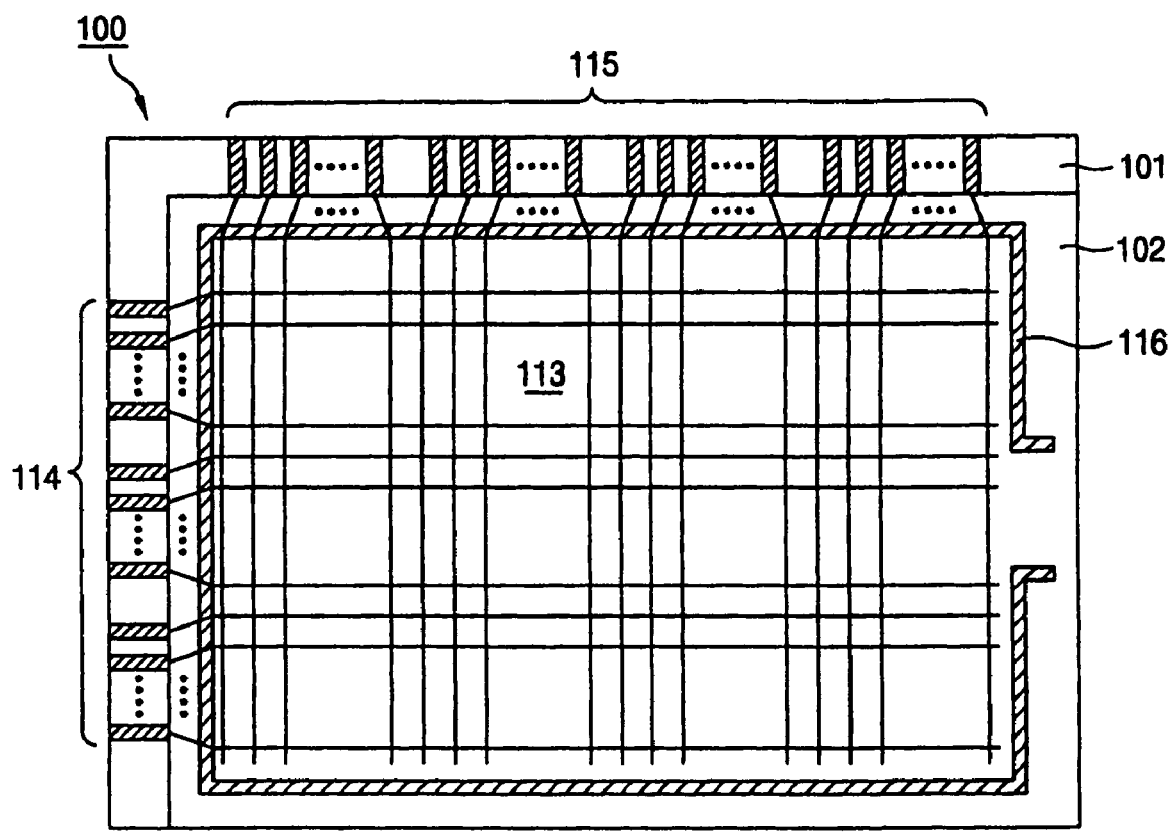
FIG. 1 is a plan view of a liquid crystal display panel according to the related art.
Figure 2A:
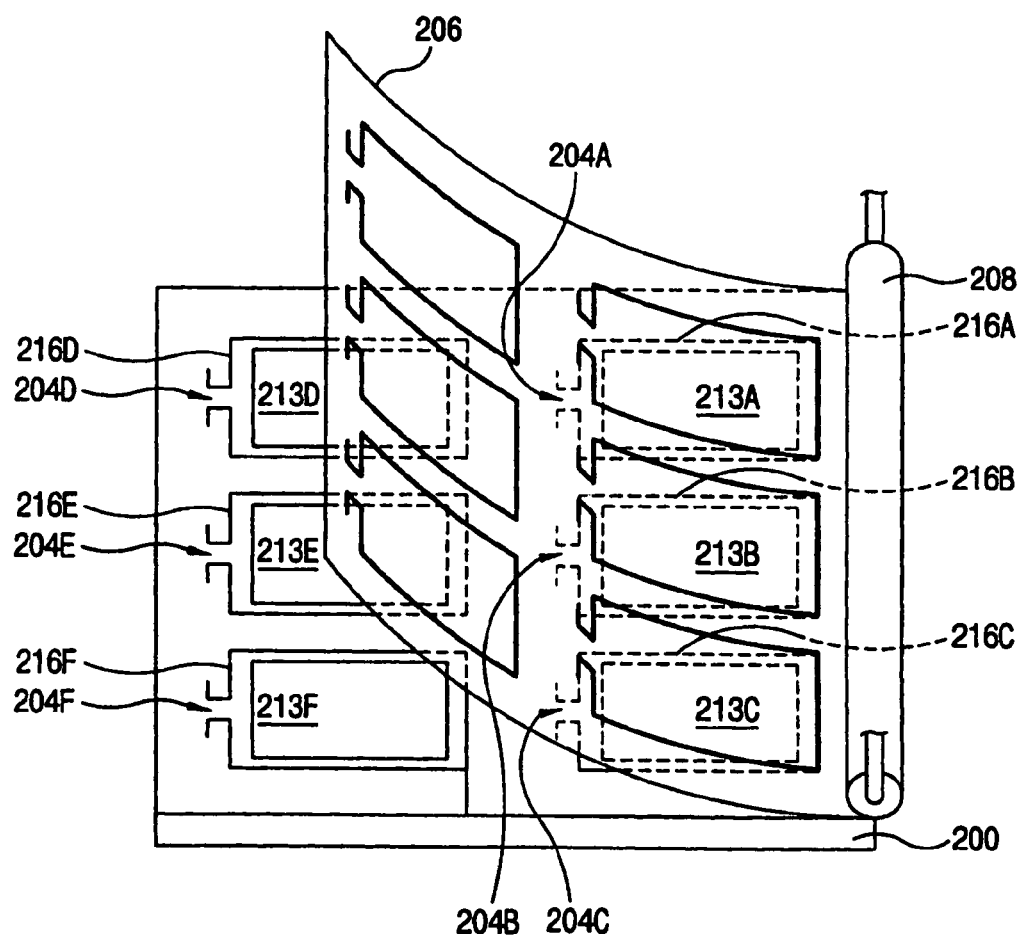
FIGS. 2A and 2B are schematic plan and cross sectional views of a process for formation of a seal pattern according to the related art.
Figure 2B:
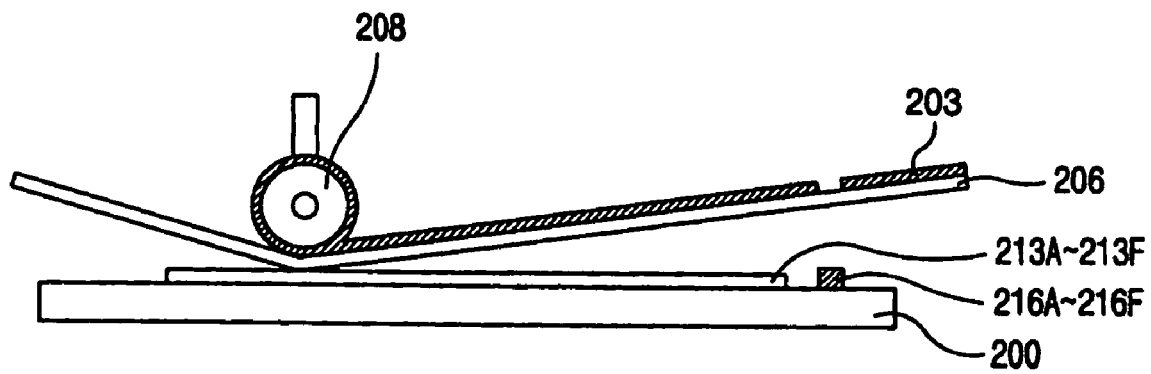
Figure 3:
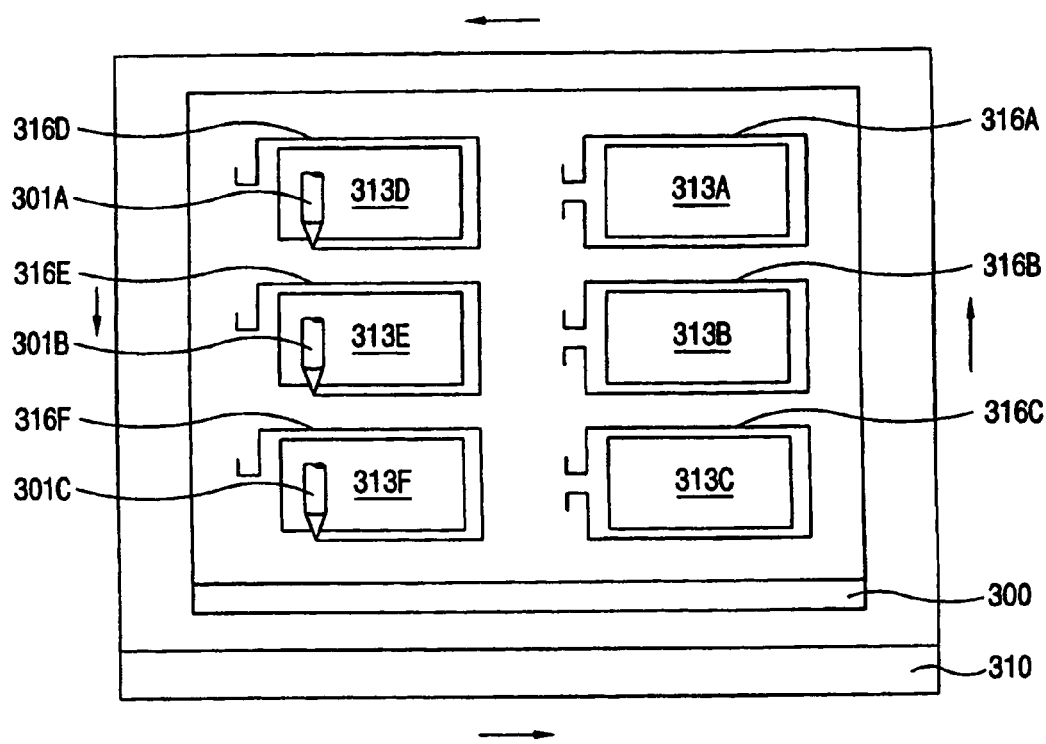
FIG. 3 is a schematic plan view of a seal pattern according to the related art.

In addition, the seal patterns 616A~616F may be formed in accordance with a desired method of providing liquid crystal material, i.e., liquid crystal injection or dropping methods. Accordingly, the seal patterns 616A~616F may have different configurations. For example, using the vacuum injection method may result in forming the seal patterns 616A~616F to have partial openings, similar to the seal patterns 316A~316F in FIG. 3. Conversely, using the dropping method may result in forming the seal patterns 616A~616F having closed patterns encompassing each outer edge of the image display parts 613A~613F, as shown in FIG. 7.

When using the dropping method, if the seal patterns 616A~616F are formed with a thermosetting sealant, the sealant may flow out to contaminate the dropped liquid crystal material while being heated during subsequent processing of the glass substrates. Thus, the seal patterns 616A~616F may be formed having an ultraviolet hardening sealant or a mixture of the ultraviolet hardening sealant and a thermosetting sealant.

In FIG. 7, when the substrate 600 is aligned along the vertical direction, the liquid crystal material dropped onto the substrate 600 using the dropping method may flow. Accordingly, the seal patterns 616A~616F may be formed on the substrate 600 where liquid crystal material may not be dropped.

Figure 8:
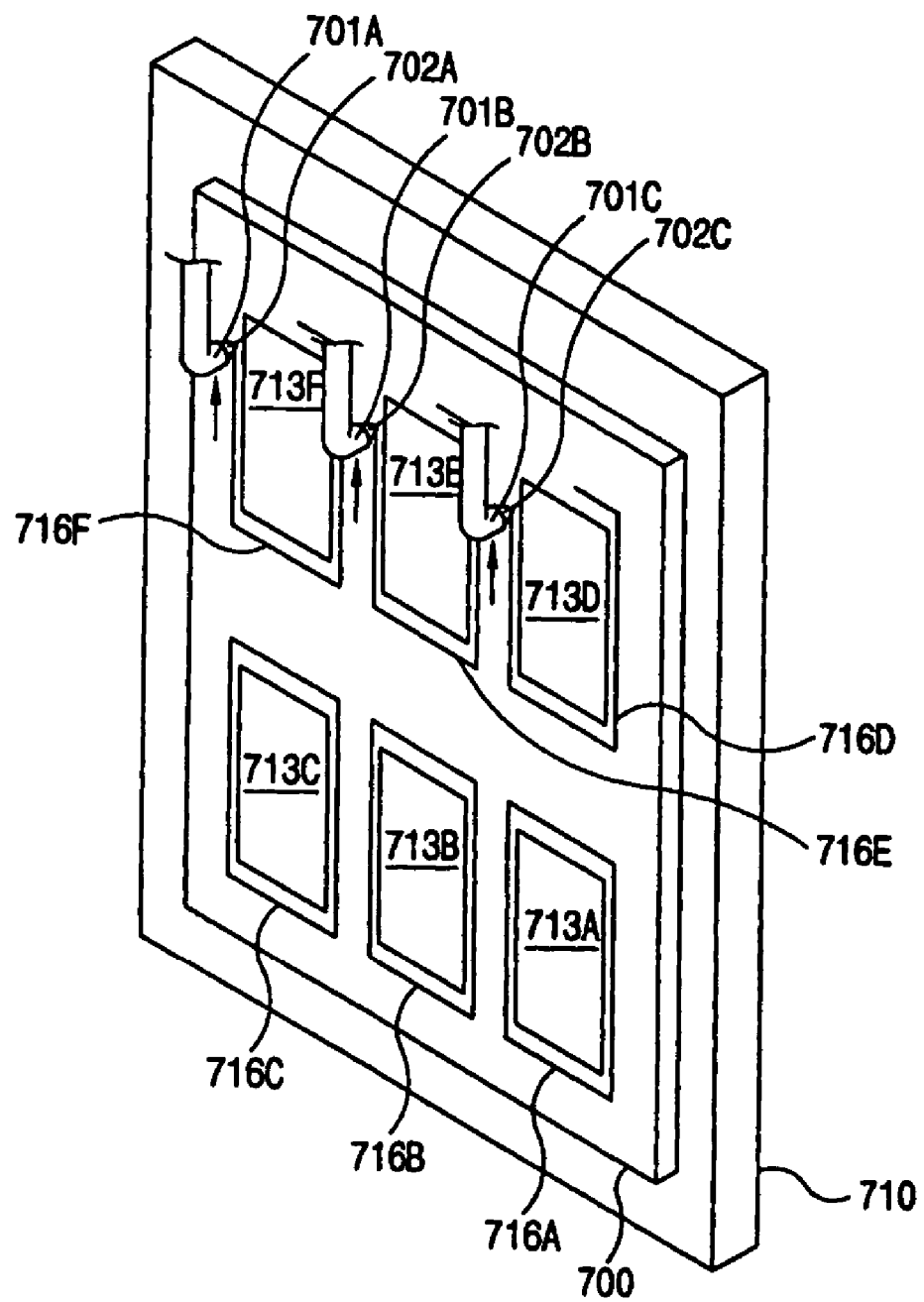
FIG. 8 is a schematic plan view of another exemplary dispenser system for a liquid crystal display panel according to the present invention.

FIG. 8 is a schematic plan view of another exemplary dispenser system for a liquid crystal display panel according to the present invention. In FIG. 8, a dispenser system for a liquid crystal display panel may include a table 710, which may vertically stand a substrate 700 having image display parts 713A~713F formed thereon that have been loaded and fixed thereon. The system may also include a plurality of syringes 701A~701C to supply a sealant along outer edges of the image display parts 713A~713F of the substrate 700 through nozzles 702A~702C, which may be provided at end portions of the plurality of syringes 701A~701C, to form seal patterns 716A~716F. In addition, the plurality of syringes 701A~701C may be moved along vertical directions in relation to the vertically-aligned substrate 700.

During a method of using the dispenser system, the substrate 700 may be loaded and fixed onto the table 710, and the table 710 may be aligned along the vertical direction and fixed. Then, the syringes 701A~701C may supply the sealant while being moved along the vertical forward/backward and left/right directions, thereby forming the seal patterns 716A~716F along the outer edges of the image display parts 713A~713F of the substrate 700. Accordingly, since a driving of the syringes 701A~701C may be performed within an area of the vertically-aligned substrate 700, although the area of the substrate 700 may increase, a size of the dispenser system equipment for forming the seal patterns 716A~716F on the substrate 700 may change (i.e., increase or decrease) to correspond to the increased area to the substrate 700.

In FIG. 8, bodies of the syringes 701A~701C may be positioned below the substrate 700 along the vertical direction in parallel to the vertically-aligned substrate 700. In addition, the syringes 701A~701C may be partially bent toward the substrate 700 so that the nozzles 702A~702C may be positioned at the outer edges of the image display parts 713A~713F of the substrate 700. Accordingly, a pressure supplying the sealant filled in the syringes 701A~701C on the substrate 700 through the nozzles 702A~702C may be reduced, thereby providing improved control of the supplied sealant pressure.

Figure 9A:
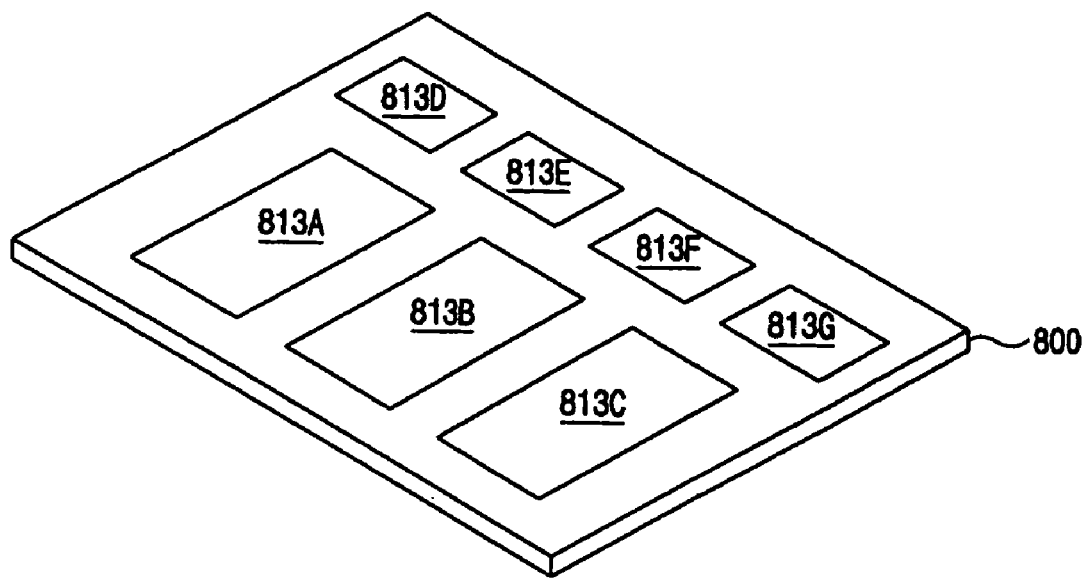
FIGS. 9A to 9D are perspective schematic views of an exemplary method of using a dispensing system according to the present invention.

FIGS. 9A to 9D are perspective schematic views of an exemplary method of using a dispensing system according to the present invention. In FIG. 9A, a first plurality of image display parts 813A~813C having a first size and a second plurality of image display parts 813D~813G having a second size may be formed on a substrate 800.

Figure 9B:
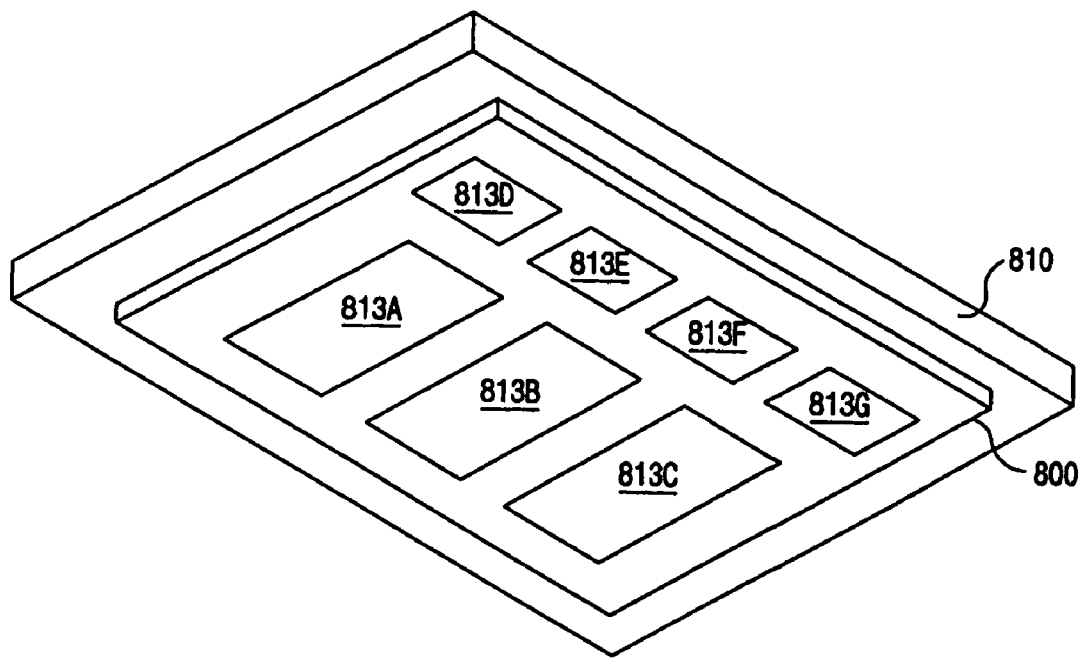

In FIG. 9B, the substrate 800, upon which the first image display parts 813A~813C having the first size and the second image display parts 813D~813G having the second size have been formed, may be loaded and fixed on a table 810, which may then be overturned.

Figure 9C:
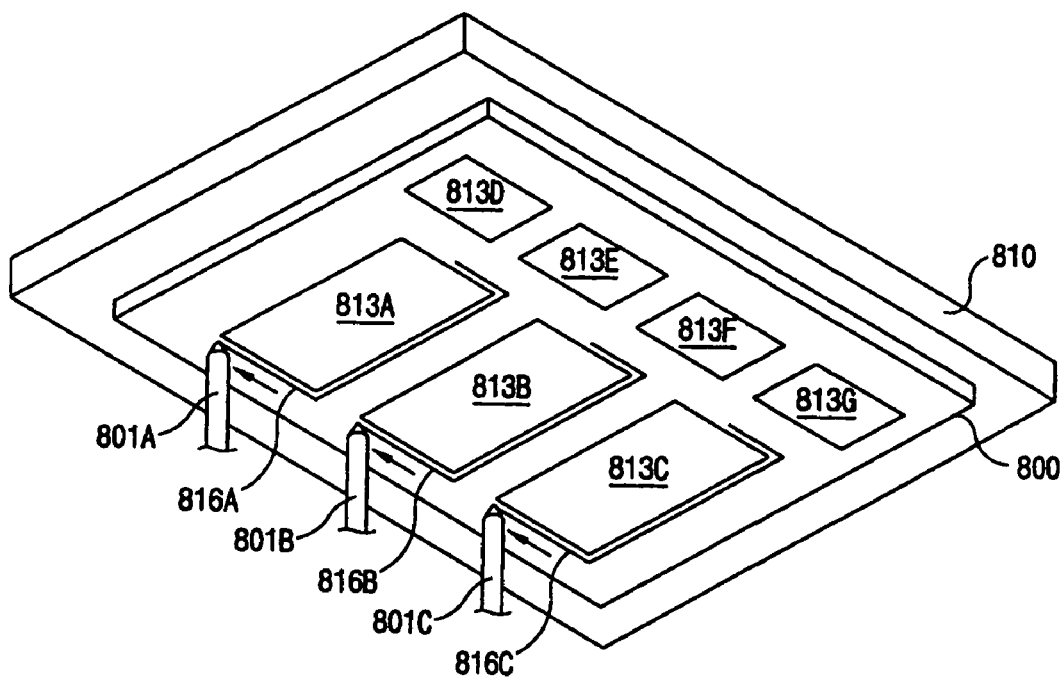

In FIG. 9C, a first plurality of syringes 801A~801C may supply sealant along outer edges of the first image display parts 813A~813C having the first size of the overturned substrate 800 to form a plurality of first seal patterns 816A~816C. In addition, the first plurality of syringes 801A~801C may be moved along horizontal forward/backward and left/right directions.

Figure 9D:
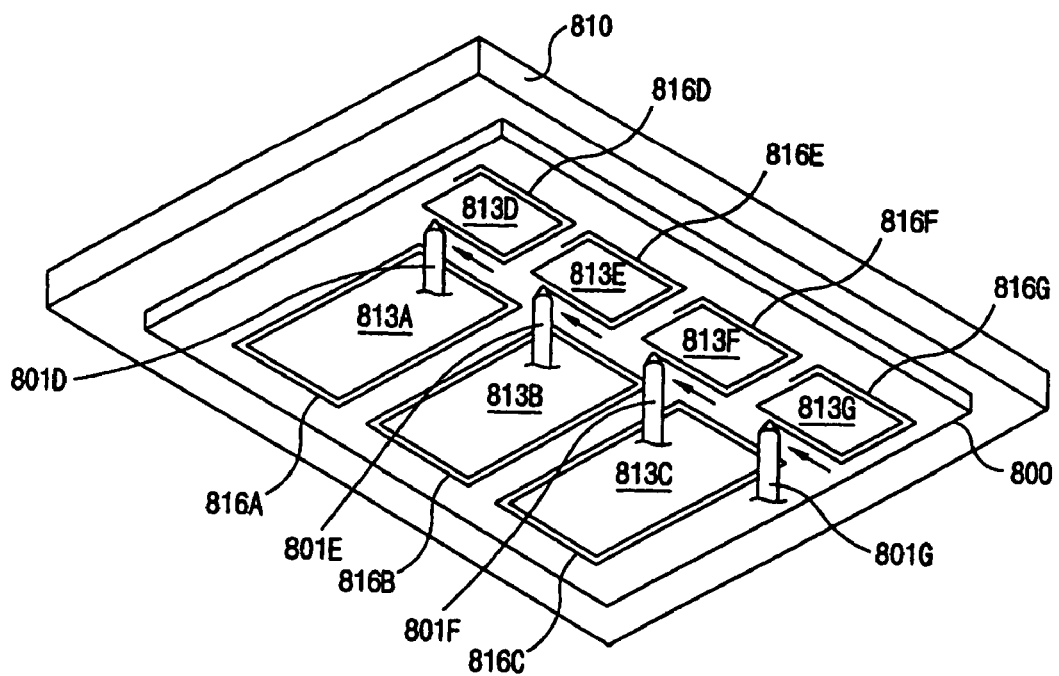

In FIG. 9D, a second plurality of syringes 801D~801G may supply sealant along outer edges of the second image display parts 813D~813G to form a plurality of second seal patterns 816D~816G. In addition, the second plurality of syringes 801D~801G may be moved along the horizontal forward/backward and left/right directions.

In FIGS. 9A-9D, the substrate may be loaded and fixed onto a single table, which may then be overturned, and the first seal patterns may be formed along outer edges of the first image display parts having the first size. Then, the second seal patterns may be formed along outer edges of the second image display parts having the second size. However, two independently driven tables may be used. For example, the substrate may be first loaded and fixed onto a first table, which is then overturned, and first seal patterns may formed along the outer edges of first image display parts having a first size. Then, the substrate may be loaded and fixed onto a second table, which is then overturned, and second seal patterns may be formed along outer edges of second image display parts having a second size.

It will be apparent to those skilled in the art that various modifications and variations can be made in the dispenser system for a liquid crystal display panel and method of using a dispenser system of the present invention without departing from the spirit or scope of the inventions. Thus, it is intended that the present invention covers the modifications and variations of this invention provided they come within the scope of the appended claims and their equivalents.

What is claimed is:

1. A method of using a dispenser system for a liquid crystal display panel, comprising:
   loading and fixing a substrate on a table;
   rotating the table to vertically align the substrate so that a first face of the liquid crystal display panel is vertical with respect to a ground;
   disposing the dispenser system having syringe of a cylindrical shape, the longitudinal axis of the syringe being parallel to the ground so that the syringe is vertical with respect to the first face of the liquid crystal display panel; and
   supplying sealant from the dispenser system onto a peripheral area of the first surface of the substrate vertically-aligned to the ground to form at least one seal pattern at the peripheral area of the first face of the substrate by driving the dispenser system along the peripheral area of a first surface of the substrate.

2. The method according to claim 1, further comprising moving the syringe system along vertical directions parallel to the first surface of the substrate during the supplying.

3. A method of dispensing sealant for a liquid crystal display panel, comprising:
   loading and fixing a substrate on a table, the substrate being vertically disposed with respect to a ground so that surfaces of the substrate are vertical to the ground;
   disposing the dispenser system having syringe of a cylindrical shape, the longitudinal axis of the syringe being parallel to the ground so that the syringe is vertical with respect to one surface of the substrate; and
   supplying sealant from a dispenser system onto a peripheral area of one surface of the substrate being vertical to the ground to form at least one seal pattern,
   wherein the dispenser system is parallel driven with respect to the ground along the peripheral area of the surface of the substrate.

4. The method according to claim 3, further comprising moving the syringe system along vertical directions parallel to the first surface of the substrate during the supplying.

* * * * *